(12) United States Patent
Schneider et al.

(10) Patent No.: US 8,421,281 B2
(45) Date of Patent: Apr. 16, 2013

(54) LINEAR DRIVE FOR A MACHINE TOOL AND METHOD FOR MOVING A TOOL CARRIAGE

(75) Inventors: Gunter Schneider, Marburg (DE); Helwig Buchenauer, Dautphetal-Buchenau (DE); Ulf Borner, Marburg (DE); Klaus Kramer, Dautphetal-Friedensdorf (DE)

(73) Assignee: Schneider GmbH & Co. KG, Fronhausen (DE)

( * ) Notice: Subject to any disclaimer, the term of this patent is extended or adjusted under 35 U.S.C. 154(b) by 97 days.

(21) Appl. No.: 12/736,172

(22) PCT Filed: Mar. 19, 2009

(86) PCT No.: PCT/EP2009/002041
§ 371 (c)(1),
(2), (4) Date: Oct. 25, 2010

(87) PCT Pub. No.: WO2009/115332
PCT Pub. Date: Sep. 24, 2009

(65) Prior Publication Data
US 2011/0050005 A1 Mar. 3, 2011

(30) Foreign Application Priority Data

Mar. 19, 2008 (DE) .......................... 10 2008 015 049

(51) Int. Cl.
*H02K 41/02* (2006.01)
(52) U.S. Cl.
USPC ............... 310/12.31; 310/12.02; 310/12.19; 310/12.29; 310/12.33

(58) Field of Classification Search ............... 310/12.05, 310/12.09, 12.01, 12.19, 12.29, 12.31, 12.33, 310/13
See application file for complete search history.

(56) References Cited

U.S. PATENT DOCUMENTS 4,769,565 A * 9/1988 Teramachi ................. 310/12.06
4,819,439 A * 4/1989 Higham .............................. 62/6
(Continued)

FOREIGN PATENT DOCUMENTS

DE 33 41 479 C2 11/1993
DE 196 41 879 A1 4/1998
(Continued)

*Primary Examiner* — Tran N. Nguyen
*Assistant Examiner* — Thomas Truong
(74) *Attorney, Agent, or Firm* — Hudak, Shunk & Farine Co. LPA

(57) ABSTRACT

The invention relates to a linear drive for a machine tool having a housing, having a carriage, which is mounted so it is axially movable in the housing via two bearings, and has a central axis and a length, and having at least one first motor, having a first motor element and a second motor element, wherein said first motor element is disposed on said carriage and said second motor element is disposed on said housing, wherein said first motor element is implemented on said carriage as a primary part and said second motor element is implemented on said housing as a secondary part. Furthermore, the invention relates to a method for moving a carriage for a lathe tool of a highly-dynamic machine tool employing a crossed roller bearing for mounting the carriage, wherein all roller bodies of said crossed roller bearing are always operationally linked to a carriage-side bearing surface, and said carriage is driven at an oscillation frequency of at least 50 Hz, in particular between 60 Hz and 200 Hz.

13 Claims, 3 Drawing Sheets

U.S. PATENT DOCUMENTS

| | | | |
|---|---|---|---|
| 5,357,158 A | | 10/1994 | Takei |
| 5,585,709 A | * | 12/1996 | Jansen et al. .................. 318/807 |
| 6,271,606 B1 | * | 8/2001 | Hazelton .................... 310/12.06 |
| 6,545,264 B1 | * | 4/2003 | Stern ............................ 250/234 |
| 6,724,104 B2 | * | 4/2004 | Katsuki et al. ............. 310/12.01 |
| 6,727,666 B2 | * | 4/2004 | Kyomasu et al. ................ 318/34 |
| 7,084,532 B2 | * | 8/2006 | Widdowson et al. ...... 310/12.05 |
| 7,173,509 B2 | * | 2/2007 | Kumano et al. ................ 336/233 |
| 2005/0258688 A1 | * | 11/2005 | Miyamoto et al. ............. 310/12 |
| 2007/0114854 A1 | * | 5/2007 | Miyamoto et al. ............. 310/12 |

FOREIGN PATENT DOCUMENTS

| | | |
|---|---|---|
| DE | 43 24 918 C2 | 5/1998 |
| DE | 198 06 832 A1 | 8/1999 |
| DE | 696 03 465 T2 | 1/2000 |
| DE | 199 39 207 A1 | 2/2001 |
| DE | 203 16 493 U1 | 2/2004 |
| DE | 699 07 801 T2 | 3/2004 |
| DE | 103 12 008 A1 | 9/2004 |
| DE | 699 16 862 T2 | 4/2005 |
| DE | 10 2005 011 689 A1 | 9/2005 |
| DE | 10 2005 041 887 A1 | 3/2006 |
| DE | 10 2004 049 951 A1 | 4/2006 |
| DE | 10 2004 056 212 A1 | 6/2006 |
| DE | 10 2006 010 945 A1 | 9/2007 |
| EP | 0849 038 A2 | 6/1998 |
| EP | 1 174 990 A2 | 5/2001 |
| WO | WO 2004/100342 A1 | 11/2004 |

* cited by examiner

LINEAR DRIVE FOR A MACHINE TOOL AND METHOD FOR MOVING A TOOL CARRIAGE

FIELD OF INVENTION

The invention relates to a linear drive for a machine tool comprising a housing, a carriage of the length l1 which is mounted in the housing so as to be axially movable in the direction of a central axis via two bearings, and at least a first motor comprising a first motor element and a second motor element, wherein the first motor element is designed as a primary part and arranged on the carriage and the second motor element is designed as a secondary part and arranged on the housing. The primary part, which is constituted by a coil, weighs less than the secondary part of the motor, which is made up of a permanent magnet. If the primary part is used as the armature of the motor thus formed, the armature, which is moved along with the primary part, can be made more lightweight as a whole. In this case, however, it must be possible to supply the primary part with the desired voltage signals, i.e. a flexible power connection or a flexible supply line must be provided for the armature or the primary part.

BACKGROUND OF THE INVENTION

From DE 10 2004 049 951 A1, a linear motor comprising two motors is known which are offset laterally, relative to the armature, while the armature is mounted on each end face by means of a double-V-shaped leaf spring arrangement which extends on both sides of the armature in each case. The primary parts of the motors are provided on the armature side and are designed flat, so that they can be driven in a slit-shaped recess of the respective secondary part on the housing side. The plane created by the respective primary part is arranged parallel to a plane created by the bearing arrangement of the carriage.

Another linear drive comprising a carrier or armature and a carrier housing is known from DE 198 06 832 A1. The carrier can be moved lengthways on the housing by means of the drive elements of two motors. The carrier has an open cross-sectional profile and serves to support the respective magnet (secondary part). The housing-side drive elements (primary parts) fill nearly the entire cross section of the carrier due to the space required for the windings. The carrier is guided in the carrier housing by means of a fixed roller bearing and a frictionless bearing in order to avoid strain.

From EP 1 174 990 A2, a linear motor comprising an armature-side primary part and a housing-side or stator-side secondary part is known. The armature is mounted so as to be axially movable in the direction of a central axis on several guide rails. All guide rails are provided on one side of the armature, relative to the central axis.

SUMMARY OF THE INVENTION

Based on the above state of the art, the object of the invention is to design and arrange a linear motor in such a manner that a robust mounting and a maximum oscillation frequency are ensured.

This object is achieved according to the invention by designing the first bearing and the second bearing as roller bearings and arranging them opposite the carriage, relative to the central axis, and at a distance a to the central axis. The carriage is thus mounted on two sides, preferably on the top and bottom, by means of the bearings. The forces to be absorbed by the bearings depend on the distance of the respective bearing from the central axis. Although a greater mass has to be moved if roller bearings are used instead of friction bearings, roller bearings are much more robust. The proposed arrangement of the bearings opposite the carriage ensures optimum absorption of the resulting forces and moments/torques.

It may also be advantageous for this purpose if the first bearing and the second bearing are designed as crossed roller bearings. The use of two crossed roller bearings which are arranged opposite the carriage ensures a sufficiently defined mounting as well as a very precise and robust mounting. Each crossed roller bearing individually constitutes a bearing which transmits three forces, thus ensuring dynamic oscillation of the carriage while sliding friction or rolling friction losses are minimal despite the length. The crossed roller bearing is designed in such a way that all roller bodies are always under load or operationally linked to the housing-side and armature-side bearing surfaces.

In addition, it may be advantageous if the first bearing and the second bearing have a length l2 and comprise at least five roller bodies each, wherein the length l2 of the bearing is at least 50% of the length l1 of the carriage. The carriage is thus mounted or guided over a sufficient length l2. This also ensures movement of the crossed roller bearing or the cage of said bearing.

It may further be advantageous if the primary part is designed flat and extends from the carriage like a wing in a radial direction R, relative to the central axis, or parallel to said direction R while the secondary part has a U-shaped cross section which forms a groove-shaped recess and in which the primary part is supported. Thanks to the U-arrangement of the secondary part, the attractive forces generated in the opposite magnets are compensated, so that the guide of the primary part or the bearings is/are under less load. If only non-magnetic material is used, noise fields and adverse effects which result from the use of spaced-apart iron parts can be prevented from occurring. The primary part is free of iron and preferably cast in with a plastic material. The primary part is therefore very lightweight.

The recess or groove which forms the U-shaped cross section is designed flat, i.e. its height is at least three times smaller than the depth of the groove or the length of the groove. The same is true for the flat shape of the primary part. The height or thickness of the primary part is at least three times smaller than the depth or width of the primary part or the length of the primary part.

As an alternative to the direction R which extends in a radial direction from the central axis of the carriage, the primary part may also extend in the direction P parallel to the aforesaid direction R. In any case, a major part of the depth or width of the primary part extends beyond the relevant coupling surface on the carriage. The primary part is supported within the groove-shaped recess over a major part of said depth or width. Both the recess and the primary part create a plane E2 in view of their flat design.

It may also be advantageous if a second motor is provided which has an identical structure and is arranged opposite the first motor, relative to the carriage, wherein both primary parts are arranged in the shared plane E2 in view of their flat basic shape. The flat design of the primary part and the arrangement of both primary parts in a plane E2 ensure an extremely small overall height of the motor thus formed. The symmetric arrangement of the motors ensures a symmetric input of force. The respective motor can be designed small due to the fact that it has to generate only half of the power.

Advantageously, the central axis and the two bearings may be arranged in a shared plane E1, which plane E1 is arranged at right angles to the plane E2. The width and height of the available installation space are divided between the arrangement of the motors, as described above, and the arrangement of the bearings. While the motors extend, for example, to the right and left towards the armature, the two bearings and the respective supports are provided on the top and bottom on the housing side. The two support surfaces for the two bearings can thus be realized as precisely as possible in the single housing part.

It may be of special importance for the present invention if the housing comprises a first housing part and a second housing part, wherein the first housing part comprises a first support surface for the first bearing, a second support surface for the second bearing and a third support surface for the secondary part. The integration of as many bearing surfaces as possible in one housing part ensures maximum precision in the production of the bearing surfaces, in particular in respect of the relative position to each other. The fact that the fourth contact surface for the second secondary part is provided on the second housing part is less critical since there is an air gap between the second secondary part and the associated primary part which is attached to the carriage. The tolerances which exist when coupling the second housing part need only be taken into account for the determination of the air gap. Accordingly, the housing-side tolerances only have an effect on the relative position between the secondary part and the primary part when the housing parts are assembled.

In connection with the embodiment and arrangement according to the invention, it may be advantageous if the carriage comprises a first end face and a second end face, wherein a holder for a tool is provided in the area of the first end face and a displacement measuring system is provided in the area of the second end face. The six spatial axes which are available for the expansion of the motor according to the invention are thus exhausted. The two remaining spatial axes are occupied by the tool or the holder for said tool in the forward direction and by the displacement measuring system on the other end. This design also ensures the desired spatial accessibility during operation for the respective sub-assembly, i.e. the motor, mounting arrangement, tool and displacement measuring system.

It may further be advantageous if a sealing means is provided by means of which the displacement measuring system is closed off from an inner space of the housing in which the guided part of the carriage and the bearings are arranged. Due to the lubricants which have to be introduced into the bearings, thus creating a source of contamination, the sealing of the displacement measuring system according to the invention serves to increase the service life and accuracy of said system. The displacement measuring system is thus arranged in a closed-off space, so that contamination is nearly impossible.

In addition, it may be advantageous if pre-stressing means are provided between the housing and the bearing by means of which the bearing can be pre-stressed against the carriage, and several screws are provided as pre-stressing means which are arranged parallel to the plane E1 and which can be pre-stressed directly or indirectly against the bearing. Thanks to the pre-stressing means according to the invention, the crossed roller bearing can be pre-stressed evenly against the carriage over the entire length, so that a play-free and low-friction mounting of the carriage is ensured. Separate screws are used to fix the bearing or bearing part which is to be pre-stressed in each case, so that a separation of functions, i.e. between pre-stressing and fixing, is ensured.

In this context, it may be advantageous if cooling means are provided by means of which the respective primary part can be cooled, and a ventilation and/or venting channel is provided as a cooling means in the area of the slit-shaped recess of the secondary part and/or in the area of the primary part. Preferably, the cooling medium used is air which is introduced or discharged via the venting channel. Cooling of the primary part is important in so far as heating of the carriage causes the same to extend in length, thus influencing the position of the tool centre point.

For this purpose, it may also be advantageous if an insulation element is provided which is arranged between the first motor element and the carriage. The insulation provided between the primary part and the carriage also ensures that as little heat as possible is transferred from the primary part or the motor to the carriage.

It may further be advantageous if the carriage is formed in one piece, wherein the displacement measuring system is coupled in the area of the second end face and/or the holder for the tool is coupled to the carriage. To ensure correct mounting of the carriage, it is advantageous that the carriage be formed in one piece including the required contact surfaces for supporting the respective bearing.

If an iron-free motor is used, effects caused by the presence of magnetic iron near the motor or even within the motor can be precluded.

It may also be advantageous if the motor is free of iron, wherein the primary part comprises a plastic core and/or a plastic casing. This prevents the effects on the operational behaviour of the motor which are associated with an iron core.

The object is also achieved by means of a method for moving a carriage for a lathe tool of a highly-dynamic machine tool employing a crossed roller bearing for mounting the carriage, wherein all roller bodies of the crossed roller bearing are always operationally linked to a carriage-side bearing surface and the carriage is operated at an oscillation frequency of at least 50 Hz, in particular between 60 Hz and 200 Hz. It is known in the state of the art to guide carriages whose oscillation frequencies are in the range claimed herein in a leaf spring bearing or air bearing. The aforesaid features according the invention, however, also ensure the use of a roller bearing for mounting a highly dynamically driven oscillating carriage.

BRIEF DESCRIPTION OF THE DRAWINGS

Further advantages and details of the invention are explained in the patent claims and in the description and illustrated in the figures, in which.

DETAILED DESCRIPTION OF THE INVENTION

Figure 1:
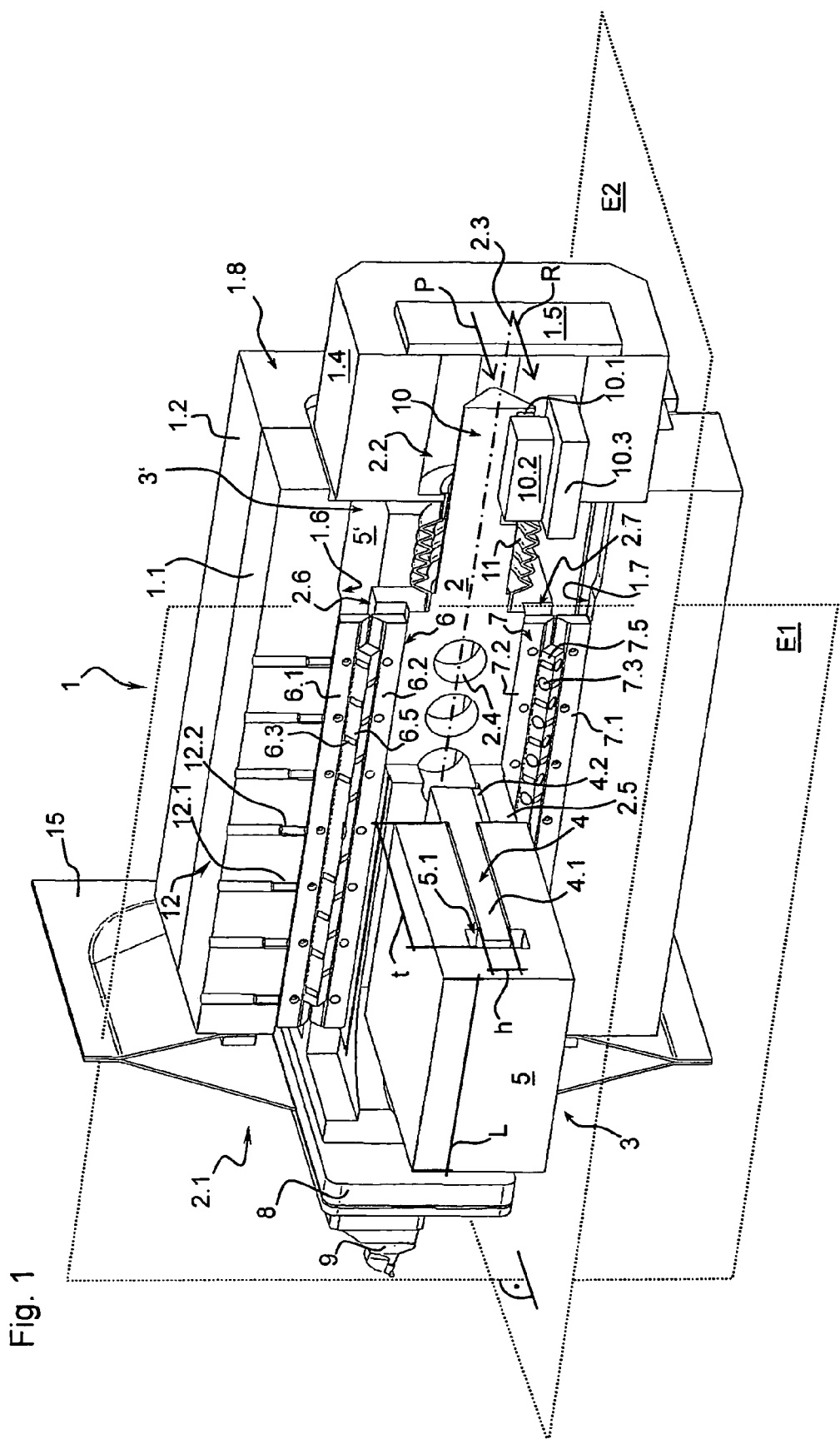
FIG. 1 shows a cross-sectional side view of a linear motor.

The linear motor illustrated in FIG. 1 comprises a housing 1 which is constituted by a first housing part 1.1 and a second housing part 1.2. Within the first housing part 1.1, an armature 2 is mounted so as to be translationally movable via two bearings 6, 7. The first housing part 1.1 comprises a first support surface 1.6 and a second support surface 1.7 which serve to support the bearings 6, 7. The respective bearing 6, 7 is designed as a crossed roller bearing and comprises an outer bearing rail 6.1, 7.1, an inner bearing rail 6.2, 7.2 and a cage 6.5 with integrated roller bodies 6.3, 7.3 in each case. In the first housing part 1.1, several screws 12.1, 12.2 are provided which are designed as pre-stressing means 12 and by means of which the bearing 6 can be pre-stressed against the carriage 2. A holder 8 for a tool 9 and the tool 9 are arranged on a first or front end face 2.1. A flexible cover 15 for sealing the housing 1 is provided between the tool holder 8 and the housing 1. A displacement measuring system 10 is provided in the area of the second or rear end face 2.2 of the armature 2. The displacement measuring system 10 comprises a strip chart 10.1 which is arranged on the armature and cooperates with a reading head 10.2 on the housing side. The reading head 10.2 is connected to the housing 1 or a rear housing cover 1.4 by means of a housing part 10.3.

While the two bearings 6, 7 are arranged above and below the armature 2 respectively, two motors 3, 3' are provided on the sides of the armature 2. The respective motor 3 consists of a first motor element 4 which is designed as a primary part and is attached to the side of the carriage 2 by means of a holder 2.5. The respective primary part 4 comprises a plastic casing 4.1 which encloses a coil (not shown). The respective primary part 4 is designed flat and as a bar and is arranged within a recess 5.1 of a second motor element 5 which is designed as a secondary part. The primary part 4 extends in the direction R or P, i.e. radially to the central axis 2.3 or parallel to said axis. The height h or thickness h of the primary part 4 is at least three times smaller than the depth t or the width t of the primary part 4 or the length L of the primary part 4. The same is true for the recess 5.1 or the groove which forms the U-shaped cross section. Its height h is at least three times smaller than the depth t of the groove 5.1 or the length L of the groove 5.1. The secondary part 5 is designed as a magnet in a double-sided configuration. The primary part 4, which is arranged in the recess 5.1 of the double-sided stator and guided by means of the carriage 2, is translationally movable forward and backward, i.e. it can oscillate, due to a motor force which can be generated. In the illustration according to FIG. 1, only one secondary part 5' of the second motor 3' can be seen. In all other respects, the second motor 3' is structured identically to the first motor 3 which is shown in the sectional view. The two motors 3, 3' are arranged on the sides opposite the carriage 2. The respective primary part 4 is designed as a flat bar, thus creating a plane E2, wherein both primary parts 4 are arranged in the plane E2 or jointly create the plane E2.

The two bearings 6, 7 are arranged above and below the armature 2 within a plane E1, as explained above, wherein the plane E1 also includes a central axis 2.3 of the armature 2.

Within the available installation space, the six spatial directions are assigned to the following sub-assemblies, as explained above. The two bearings 6, 7 extend upward and downward, the two motors 3, 3' extend to the left and right, the tool holder 8 and the tool 9 extend forward in the area of the first end face 2.1 and the displacement measuring system 10 extends backwards in the area of the second end face 2.2.

Figure 2:
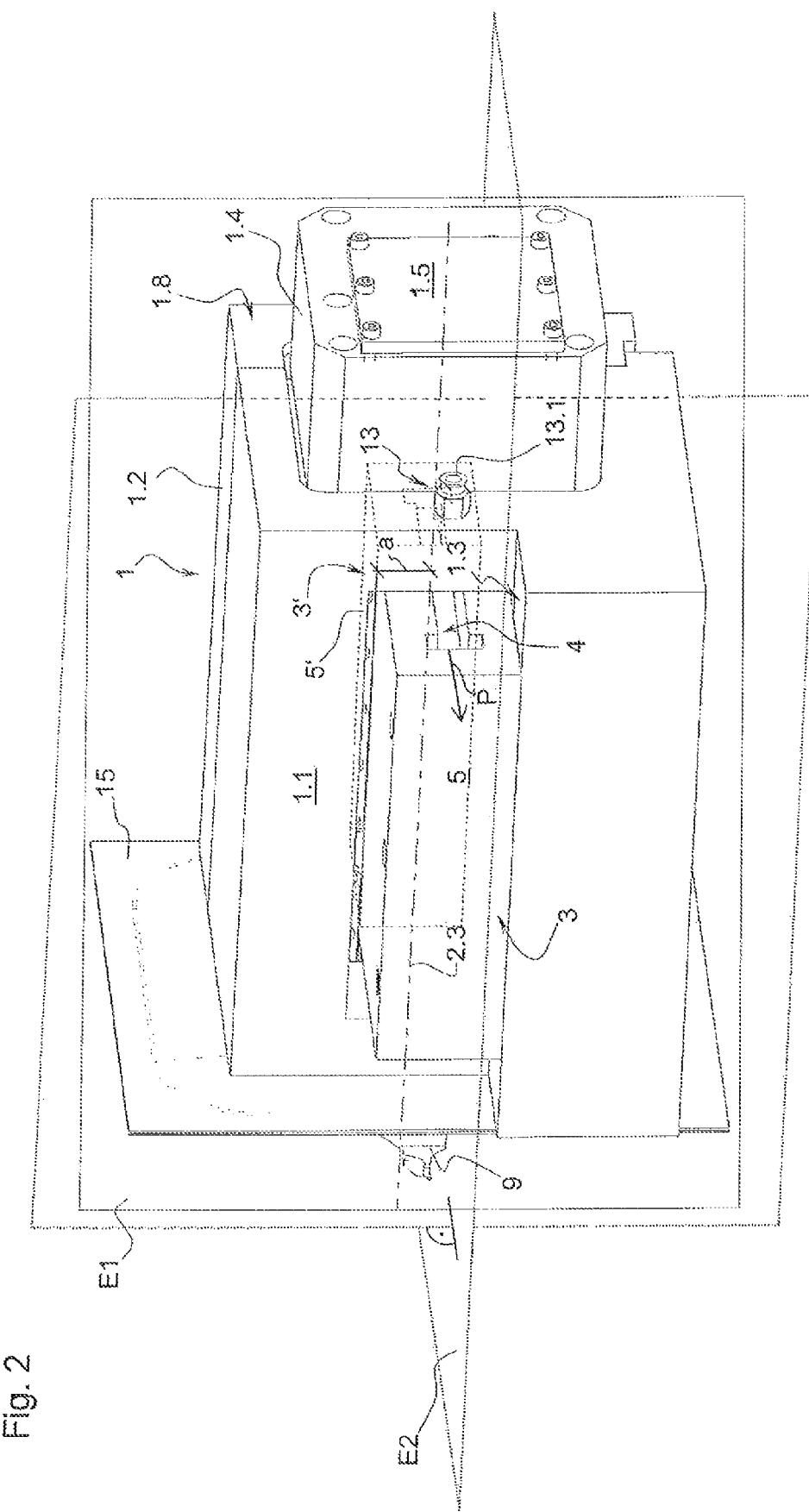
FIG. 2 shows a side view of the linear motor.

According to the illustration in FIG. 2, the housing 1 comprises the cover 1.4 with the lid 1.5 at the rear end of the displacement measuring system 10. The lid 1.5 provides access to the displacement measuring system 10. The displacement measuring system 10 is closed off from the bearings 6, 7 or the inner space of the housing by means of a sealing means 11 which is designed as bellows. The displacement measuring system 10 or the rear end face 2.2 of the carriage 2 extends into the box-shaped housing cover 1.4 on a rear end face 1.8 of the housing 1. The primary part 4 extends like a wing in the direction P, at right angles to the central axis 2.3.

In order to ventilate and vent the respective motor 3 or the area of the primary part 4, a ventilation and venting channel 13.1 is provided as a cooling means 13. The ventilation and venting channel 13.1 serves to supply and/or discharge the cooling medium, i.e. air, from or into the area of the primary part 4 of the respective motor 3.

In order to prevent an excessive heat transfer to the respective motor 3, 3' or from the respective primary part 4 to the carriage 2, an insulation element 4.2 is provided between the respective primary part 4 and the respective carriage 2 or a holding surface 2.7 for the primary part 4, as illustrated in FIG. 1.

According to FIG. 2, the first housing part 1.1 comprises a third support surface 1.3 for the primary part 4 of the motor 3. Analogously, the second housing part 1.2 comprises a fourth support surface (not shown) for the corresponding secondary part 5' of the second motor 3'.

Figure 3:
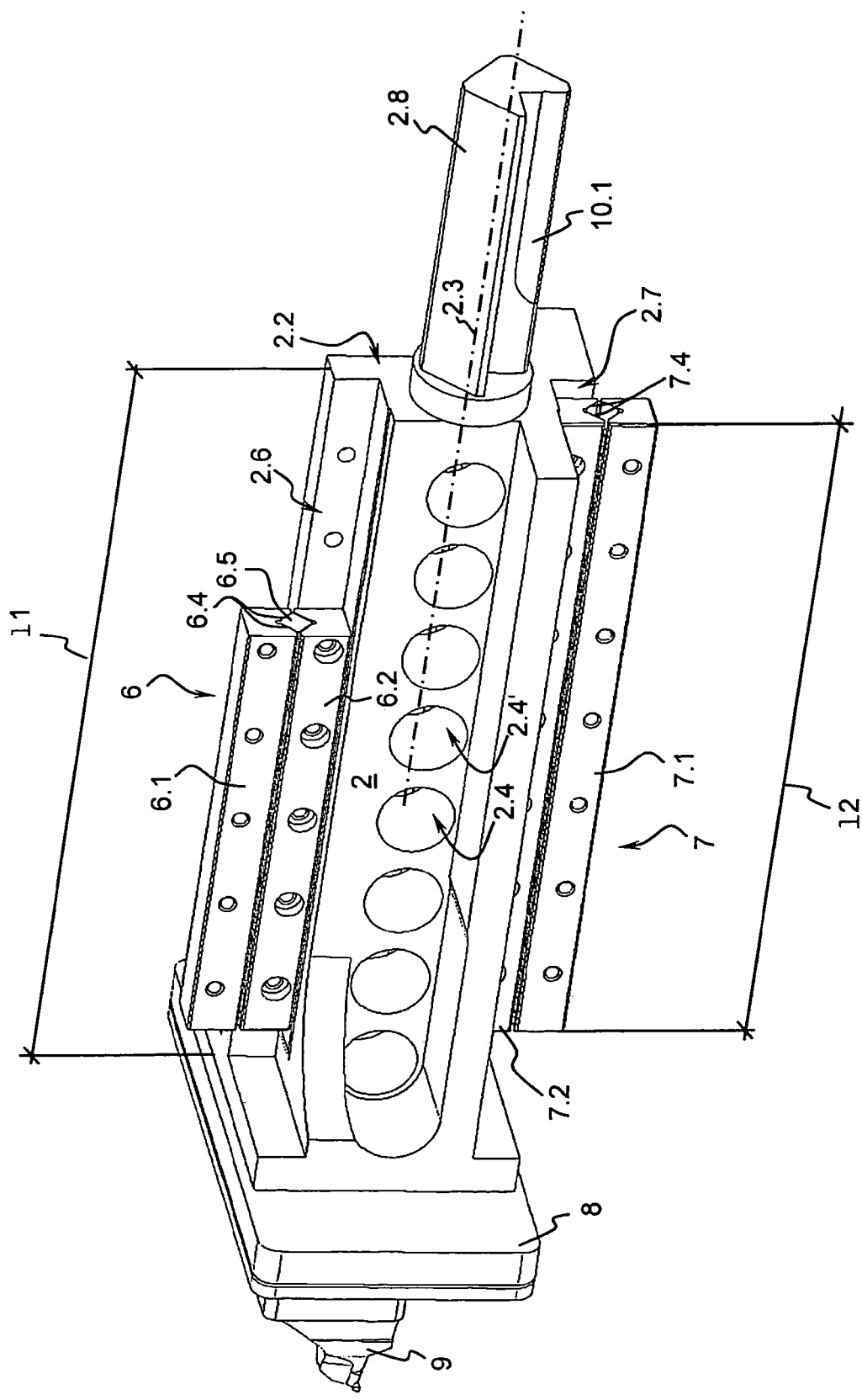
FIG. 3 shows the armature with the bearing and the tool.

According to FIG. 3, the tool holder 8 and the tool 9 are arranged on the carriage 2 in the area of the front end face 2.1. A neck 2.8 which serves to support the strip chart 10.1 is provided in the area of the rear end face 2.2. According to the exemplary embodiment of FIG. 1, the carriage 2 and the neck 2.8 form one component, and according to the exemplary embodiment of FIG. 3, they form two separate components which are connected to each other. The carriage comprises several holes 2.4, 2.4' which extend transversely to the central axis 2.3 and parallel to the plane E2 and serve to reduce the weight of the carriage.

The carriage 2 comprises an upper holding surface 2.6 and the lower holding surface 2.7 to support the respective bearing 6, 7 or to support the respective inner bearing rail 6.2, 7.2. The respective holding surface 2.6, 2.7 and the respective bearing 6, 7 have a length l2 which is approximately 90% of a length l1 of the carriage 2. The roller bodies with the cage 6.5 are arranged between the respective outer bearing rail 6.1, 7.1 and the respective inner bearing rail 6.2, 7.2. The respective bearing rail 6.1-7.2 comprises a pair of housing-side bearing surfaces 6.4 and a pair of carriage-side bearing surfaces 7.4 respectively which enclose an angle of 90° to each other in each case. The respective roller bodies 6.3 are arranged so as to alternate according to the alignment of the respective bearing surface 6.4, 7.4. The respective inner bearing rail 6.2 or outer bearing rail 7.1 comprises corresponding bearing surfaces.

The upper bearing 6 is shown in a sectional view in the illustration according to FIG. 3.

LIST OF REFERENCE NUMERALS

1 Housing
1.1 First housing part
1.2 Second housing part
1.3 Third support surface
1.4 Cover
1.5 Lid
1.6 First support surface
1.7 Second support surface
1.8 End face, rear
2 Carriage, armature
2.1 First end face
2.2 Second end face
2.3 Central axis
2.4 Hole
2.4' Hole
2.5 Holder
2.6 Holding surface, top
2.7 Holding surface, bottom
2.8 Neck
3 Motor
3' Second motor
4 First motor element, primary part
4.1 Plastic casing 4.2 Insulation element 5 Second motor element, double-sided stator, secondary part
5' Second motor element, double-sided stator, secondary part
5.1 Recess, groove
6 First bearing, crossed roller bearing, roller bearing
6.1 Outer bearing rail
6.2 Inner bearing rail
6.3 Roller bodies
6.4 Bearing surface, housing side
6.5 Cage
7 Second bearing, crossed roller bearing, roller bearing
7.1 Outer bearing rail
7.2 Inner bearing rail
7.3 Roller bodies
7.4 Bearing surface, carriage side
7.5 Cage
8 Holder
9 Tool
10 Displacement measuring system
10.1 Strip chart
10.2 Reading head
10.3 Housing part
11 Sealing means
12 Pre-stressing means
12.1 Screws
12.2 Screws
13 Coolant
13.1 Ventilation and/or venting channel
15 Cover
a Distance
E1 Plane
E2 Plane
h Height, thickness
L Length
l1 Length
l2 Length
P Direction
R Direction
t Depth, width

What is claimed is:

1. A linear drive for a machine tool, comprising: a housing, a carriage of a length l1 which is mounted in the housing so as to be axially movable in a direction of a central axis via two bearings, and at least a first motor comprising a first motor element and a second motor element, wherein the first motor element is designed as a primary part and arranged on the carriage and the second motor element is designed as a secondary part and arranged on the housing, wherein the first bearing and the second bearing are designed as crossed roller bearings and arranged opposite the carriage, relative to the central axis, and at a distance a to the central axis, wherein the primary part is designed flat and extends from the carriage in a radial direction R, relative to the central axis, or parallel to said direction R while the secondary part has a U-shaped cross section which forms a groove-shaped recess and in which the primary part is supported, wherein a second motor is provided which has structure as defined for the first motor and is arranged opposite the first motor, relative to the carriage, wherein both primary parts are arranged in a shared plane E2 in view of their flat basic shape, wherein the central axis and the two bearings of the carriage are arranged in a shared plane E1, which plane E1 is arranged at right angles to said plane E2, wherein all roller bodies of the crossed roller bearing are always operationally linked to a carriage-side bearing surface.

2. The linear drive according to claim 1, wherein the first bearing and the second bearing have a length l2 and comprise at least five roller bodies each, wherein the length l2 of the bearing is at least 50% of the length l1 of the carriage.

3. The linear drive according to claim 1, wherein the housing comprises a first housing part and a second housing part, wherein the first housing part comprises a first support surface for the first bearing, a second support surface for the second bearing and a third support surface for the secondary part.

4. The linear drive according to claim 1, wherein the carriage comprises a first end face and a second end face, wherein a holder for a tool is provided in an area of the first end face and a displacement measuring system is provided in an area of the second end face.

5. The linear drive according to claim 4, wherein a sealing means is provided by means of which the displacement measuring system is closed off from an inner space of the housing in which the bearings of the carriage are arranged.

6. The linear drive according to claim 5, wherein the carriage is formed in one piece, wherein the displacement measuring system is coupled in the area of the second end face and/or the holder for the tool is coupled to the carriage.

7. The linear drive according to claim 1, wherein pre-stressing means are provided between the housing and the bearing by means of which the bearing can be pre-stressed against the carriage, wherein several screws are provided as pre-stressing means which are arranged parallel to the plane E1 and which can be pre-stressed directly or indirectly against the bearing.

8. The linear drive according to claim 1, wherein cooling means are provided by means of which the respective primary part can be cooled.

9. The linear drive according to claim 8, wherein a ventilation and/or venting channel is provided as a cooling means in the area of a slit-shaped recess of the secondary part and/or in the area of the primary part.

10. The linear drive according to claim 1, wherein an insulation element is provided which is arranged between the first motor element and the carriage.

11. The linear drive according to claim 1, wherein the first motor and the second motor are free of iron, wherein the primary part comprises a plastic core and/or a plastic casing.

12. The linear drive according to claim 1, wherein the first bearing and the second bearing have a length l2 and comprise at least five roller bodies each, wherein the length l2 of the bearing is at least 50% of the length l1 of the carriage, and wherein the housing comprises a first housing part and a second housing part, wherein the first housing part comprises a first support surface for the first bearing, a second support surface for the second bearing acid a third support surface for the secondary part.

13. The linear drive according to claim 12, the carriage comprises a first end face and a second end face, wherein a holder for a tool is provided in an area of the first end face and a displacement measuring system is provided in an area of the second end face, wherein a sealing means is provided by means of which the displacement measuring system is closed off from an inner space of the housing in which the bearings of the carriage are arranged, and wherein pre-stressing means are provided between the housing and the bearing by means of which the bearing can be pre-stressed against the carriage, wherein several screws are provided as pre-stressing means which are arranged parallel to the plane E1 and which can be pre-stressed directly or indirectly against the bearing.

* * * * *

UNITED STATES PATENT AND TRADEMARK OFFICE
CERTIFICATE OF CORRECTION

PATENT NO. : 8,421,281 B2  
APPLICATION NO. : 12/736172  
DATED : April 16, 2013  
INVENTOR(S) : Gunter Schneider et al.

Page 1 of 1

It is certified that error appears in the above-identified patent and that said Letters Patent is hereby corrected as shown below:

In the Claims:

In claim 12, column 8, line 50, replace the word "acid" with the word "and".

Signed and Sealed this
Eighteenth Day of June, 2013

Teresa Stanek Rea
*Acting Director of the United States Patent and Trademark Office*